(12) United States Patent
Fenstemaker et al.

(10) Patent No.: US 6,490,684 B1
(45) Date of Patent: Dec. 3, 2002

(54) ULTRASOUND METHOD AND SYSTEM FOR ENABLING AN ULTRASOUND DEVICE FEATURE

(75) Inventors: David E. Fenstemaker, Mt. View, CA (US); Steven U. Raiff, Mt. View, CA (US)

(73) Assignee: Acuson Corporation, Mountain View, CA (US)

( * ) Notice: Subject to any disclaimer, the term of this patent is extended or adjusted under 35 U.S.C. 154(b) by 0 days.

(21) Appl. No.: 09/052,466

(22) Filed: Mar. 31, 1998

(51) Int. Cl.[7] .................................................. H04L 9/00
(52) U.S. Cl. ....................................................... 713/182
(58) Field of Search ................................ 713/182, 189, 713/201; 705/59, 2

(56) References Cited

U.S. PATENT DOCUMENTS

| | | | | |
|---|---|---|---|---|
| 5,499,295 A | * | 3/1996 | Cooper | 380/270 |
| 5,553,144 A | * | 9/1996 | Almquist et al. | 713/100 |
| 5,603,323 A | * | 2/1997 | Pflugrath et al. | 600/437 |
| 5,708,709 A | * | 1/1998 | Rose | 705/59 |
| 5,771,287 A | * | 6/1998 | Gilley et al. | 713/191 |
| 5,956,408 A | * | 9/1999 | Arnold | 713/189 |
| 6,063,030 A | * | 5/2000 | Vara et al. | 600/437 |

* cited by examiner

Primary Examiner—Matthew Smithers

(57) ABSTRACT

An ultrasound method and system are presented for enabling an ultrasound device feature. An ultrasound device is installed with features that are not immediately available for use (i.e., the features are installed disabled). To enable these features, a key is locally or remotely supplied to the ultrasound device. With these preferred embodiments, hardware or software features of an ultrasound device can be enabled on demand for evaluation purposes. Further, if the feature is enable for a limited amount of time, a user can pay a reduced fee for the temporary use of the feature. Additionally, because the necessary hardware is factory-installed in and shipped with the ultrasound device, a user who desires the temporary or permanent use of a hardware feature can enable the feature without taking the ultrasound device off-line.

31 Claims, 5 Drawing Sheets

ULTRASOUND METHOD AND SYSTEM FOR ENABLING AN ULTRASOUND DEVICE FEATURE

BACKGROUND

Ultrasound devices are capable of performing several hardware and/or software features. Depending on the features ordered by a user, a vendor often installs only a subset of available features onto a device. Once installed, these features are enabled and are available for immediate use by the user. Often, a user desires to add a feature that was not ordered with the ultrasound device. For some features, the vendor can provide the feature to the ultrasound device with software transferred using a network link, modem, or removable media. For other features, hardware (e.g., programmable read-only memory devices) must be installed on the ultrasound device. As with features originally installed in the device, new features are enabled and available for immediate use upon installation.

There are several disadvantages associated with the current method of providing features to ultrasound devices. Because some features require additional hardware be installed in the ultrasound device, some users are reluctant or unable to take their ultrasound device off-line for the feature upgrade. Also, some users are reluctant to purchase a feature upgrade if they are unfamiliar with the feature. As a result, many users do not realize the benefits of many of the features available to them. There is, therefore, a need for an improved ultrasound method and system for overcoming these disadvantages.

SUMMARY

The present invention is defined by the following claims, and nothing in this section should be taken as a limitation on those claims.

By way of introduction, in the preferred embodiments described below, an ultrasound device is installed with features that are not immediately available for use (i.e., the features are installed disabled). To enable these features, a key is locally or remotely supplied to the ultrasound device on demand. With this functionality, a user can evaluate a feature on a trial basis. After becoming familiar with the feature, the user can decide to purchase the feature for permanent use. Additionally, because the necessary hardware is factory-installed in and shipped with the ultrasound device, a user who desires the temporary or permanent use of a hardware feature can enable the feature simply by receiving the enabling key on demand without taking the ultrasound device off-line.

The preferred embodiments will now be described with reference to the attached drawings.

DETAILED DESCRIPTION OF THE PRESENTLY PREFERRED EMBODIMENTS

Figure 1:
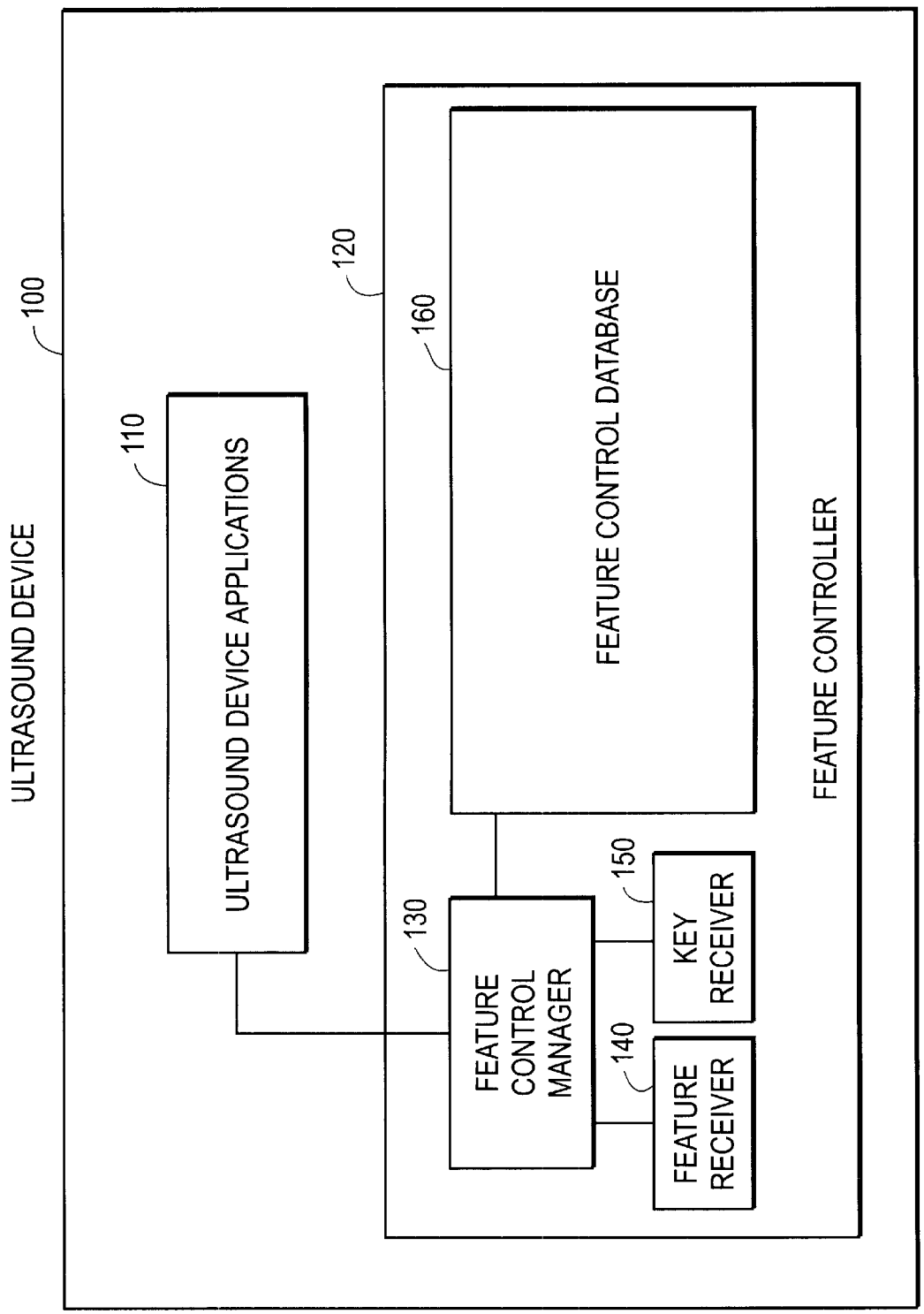
FIG. 1 is a block diagram of an ultrasound device of a preferred embodiment.

Turning now to the drawings, FIG. 1 shows a block diagram of an ultrasound device 100 of a preferred embodiment. For simplicity, the term "ultrasound device" is used to refer to existing or later developed devices that are directly or indirectly used with ultrasound imaging. Examples of ultrasound devices include, but are not limited to, an ultrasound imaging system, an ultrasound image review station, an ultrasound image management server, and an ultrasound network management server. Also for simplicity, the term "feature" is used to refer to a function of an ultrasound device. A feature can be implemented with hardware, software, or a combination of hardware and software. For example, on an ultrasound imaging system, a hardware feature can be a use of a particular transducer, a software feature can be harmonic imaging, and a combination of hardware and software features can be the use of harmonic imaging with a particular transducer. The ultrasound device 100 shown in FIG. 1 comprises ultrasound device applications 110 and a feature controller 120, which comprises a feature control manager 130 coupled with a feature receiver 140, a key receiver 150, and a feature control database 160. As used herein, the term "coupled with" means directly coupled with or indirectly coupled with through one or more components. While the ultrasound device 100 may comprise additional components, many, if not all, of these additional components depend on the specific ultrasound device used and, thus, are not shown in FIG. 1.

Figure 2:
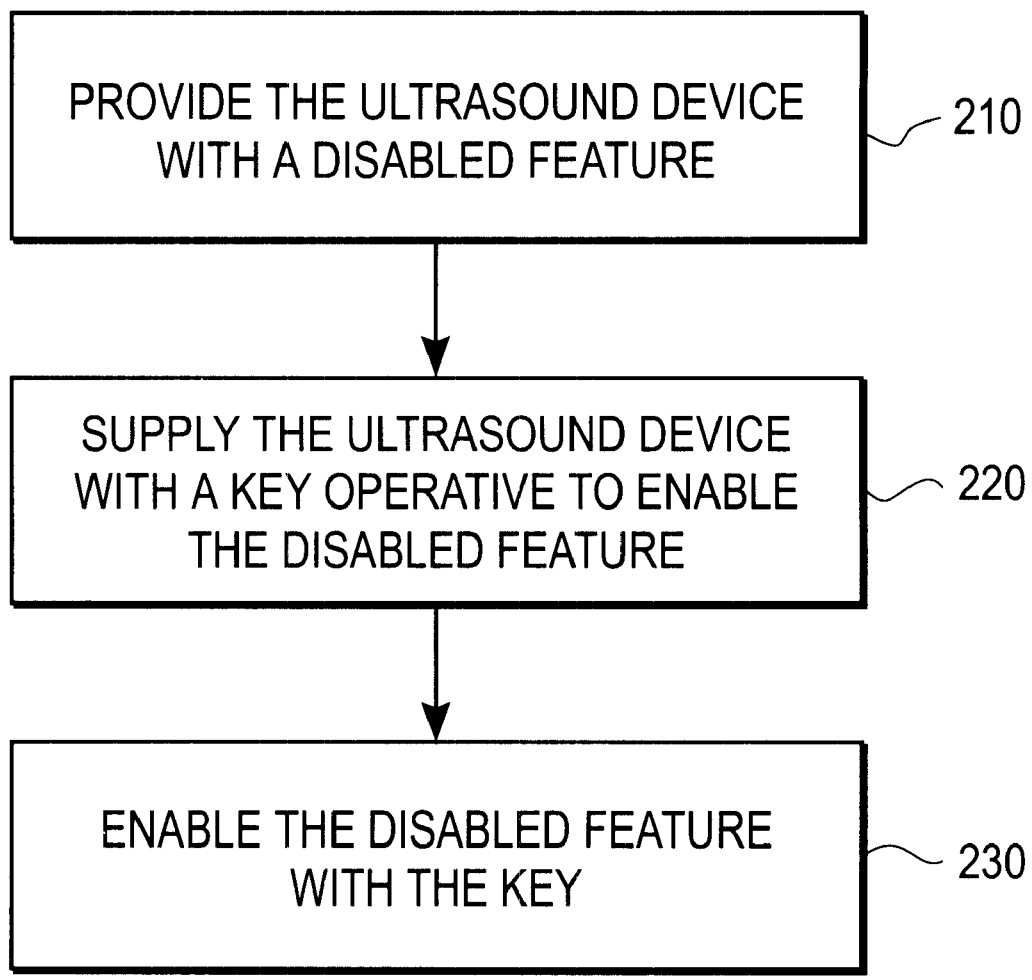
FIG. 2 is a flow chart of a method of a preferred embodiment for enabling features on an ultrasound device.

FIG. 2 is a flow chart of a method of a preferred embodiment for enabling a feature on an ultrasound device. As shown in FIG. 2, the first step of this method is to provide the ultrasound device 100 with a disabled feature (step 210). Before a user receives the ultrasound device 100, a device vendor determines which features will be included in the device's feature set, which is preferably stored in the feature control database 160 of the feature controller 120. After a user receives the ultrasound device 100, additional features, such as those not developed at the time of the original shipment of the ultrasound device 100, can be provided via the feature receiver 140. The feature receiver 140 can be a device operative to receive removable media, such as magnetic or optical discs, containing a new feature. In this way, a new feature set can be locally installed. If the feature receiver 140 contains a network link or a modem, a new feature set can be installed remotely from a vendor's computer. After a feature is received, the feature control manager 130 updates the feature control database 160 with the received feature and information that can be used to validate a key offered to enable the feature, as described below. Of course, if the feature controller 120 does not contain a feature receiver 140, the user still has access to those features originally installed on the device 100.

Figure 3:
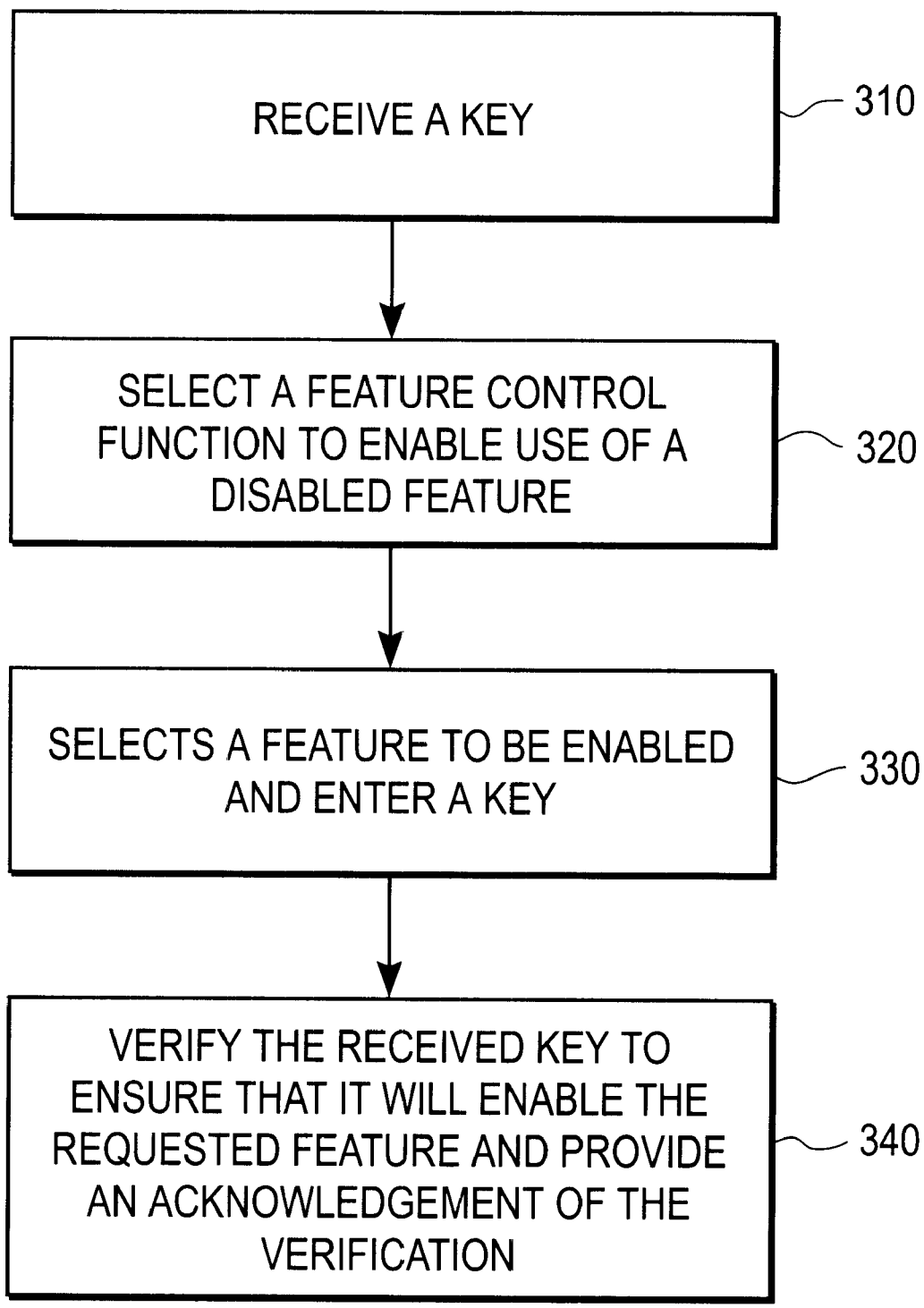
FIG. 3 is a flow chart of a method for locally supplying an ultrasound device with a key operative to enable a disabled feature.

Unlike features installed in conventional ultrasound devices, at least some of the features installed in the ultrasound device 100 of this preferred embodiment are not immediately available for use (i.e., at least some features are installed disabled). To use a disabled feature, the ultrasound device 100 is supplied with a key operative to enable the disabled feature (step 220). The key can be supplied to the ultrasound device 100 either locally or remotely. FIG. 3 is a flow chart of a method for locally supplying the ultrasound device with a key operative to enable a disabled feature. First, a user receives the key from, for example, an ultrasound device vendor (step 310). The user can receive the key when he orders an ultrasound device or when he later orders an additional feature from the vendor. The key can be in the form of alphanumeric symbols that can be supplied to the user in writing, over the phone, via email, or via facsimile, for example. The key can also be embodied on removable media, such as magnetic or optical devices, for example. Next, using the feature control manager 130, the user selects a feature control function to enable the use of a disabled feature (step 320). Preferably, the feature control manager 130 determines which features are enabled and disabled and presents this information to the user. Then, the user selects the feature to be enabled and enters the key via the key receiver 150 (step 330). If the key is in the form of alphanumeric symbols, the key receiver 150 can be a user interface such as a keyboard, optical scanner, or voice recognition device. If the key is embodied on removable media (e.g., a magnetic disc), the key receiver 150 can be adapted to receive such removable media (e.g., a magnetic disc drive). It is preferred that the feature control manager 130 verify the received key to ensure that it will enable the requested feature and provide an acknowledgement of the verification to the user (step 340). For example, if the key is verified, the feature control manager 130 can provide the user with an updated list showing which features are enabled and which are disabled. Additionally, if the key fails, the feature control manager 130 can display a failure message to the user. It is important to note that although the method described above is preferred, other methods can be used.

Figure 4:
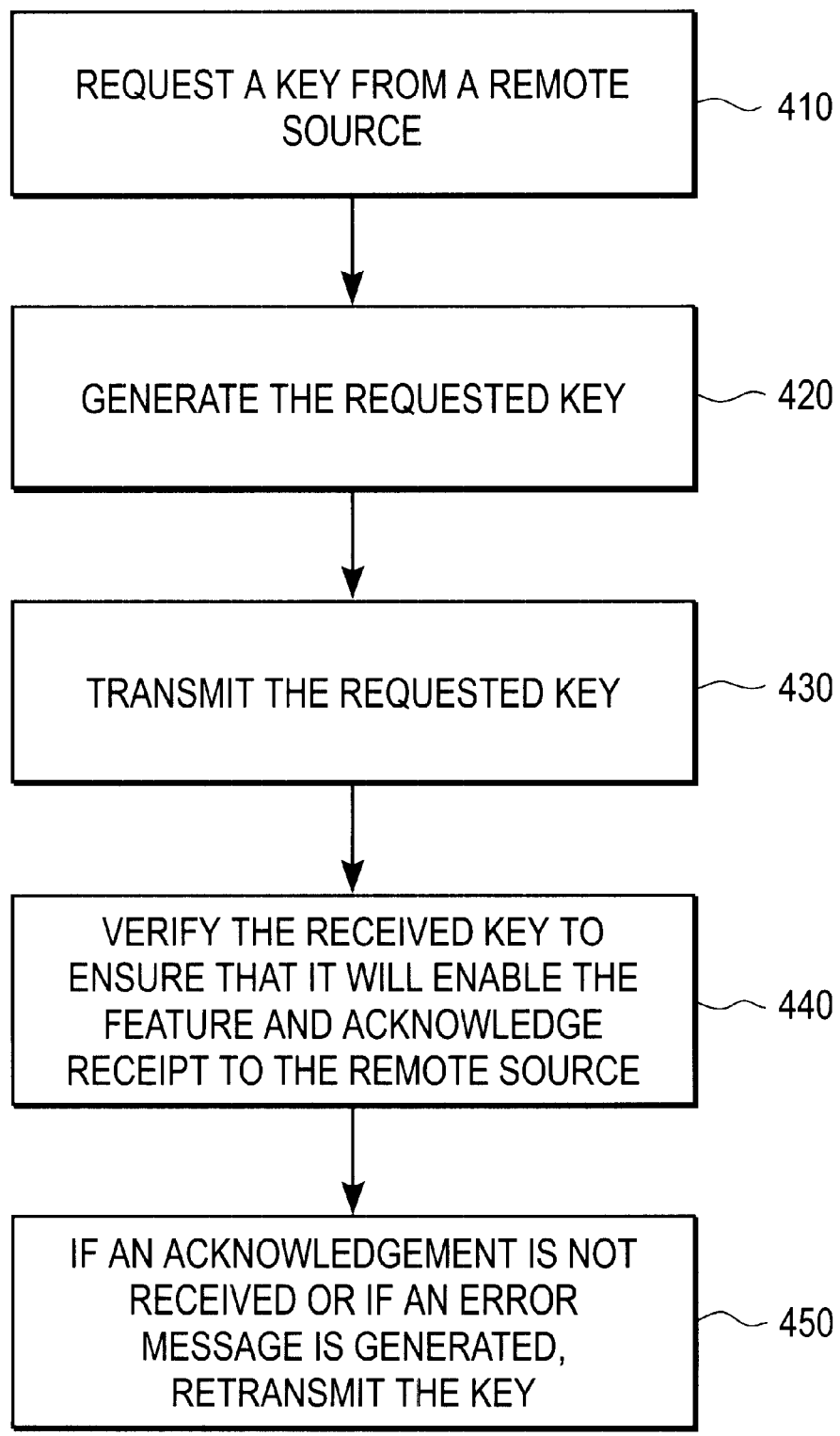
FIG. 4 is a flow chart of a method for remotely supplying an ultrasound device with a key operative to enable a disabled feature.

As mentioned above, in addition to or instead of locally receiving a key, the ultrasound device 100 can remotely receive a key, as illustrated in the flow chart of FIG. 4. First, a user requests a key from a remote source, such as an ultrasound device vendor (step 410). As described in more detail below, the request preferably comprises information identifying the feature to be enabled and the specific ultrasound device. Next, the key is generated by the remote source (step 420) and transmitted to the ultrasound device 100 via the key receiver 150, which can be, for example, a network link or modem (step 430). It is possible that the remote source can generate an incorrect key or that a correctly generated key can become corrupted by a noisy transmission. Accordingly, it is preferred that the feature control manager 130 verify the received key to ensure that it will enable the feature and acknowledge receipt to the remote source (step 440). If an acknowledgement is not received or if an error message is generated, the remote source can retransmit the key (step 450). It is important to note that although the method described above is preferred, other methods can be used. Regardless of the way in which the key is received, it is preferred that the received key be stored in the feature control database 160 for future or repeated use. Alternatively, the received key can be valid only for a single use.

Figure 5:
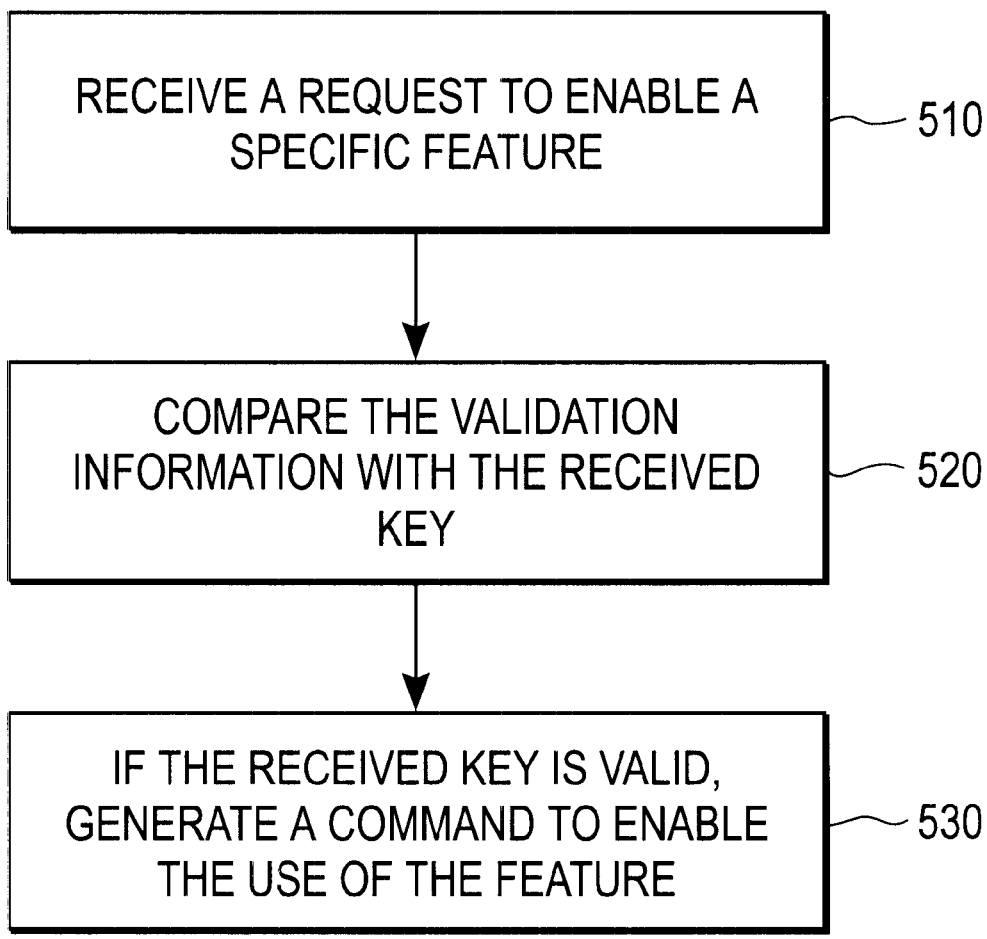
FIG. 5 is a flow chart of a preferred method for enabling a disabled feature of an ultrasound device with a key.

Turning again to FIG. 2, after the key is either locally or remotely received, the disabled feature is enabled with the key (step 230). FIG. 5 is a flow chart of one preferred implementation of this step. First, the feature control manager 130 receives a request from an ultrasound application 1 10 to enable a specific feature (step 510). Next, the feature control manager 130 compares the validation information stored in the feature control database 160 with the received key, which preferably also is stored in the feature control database 160 (step 520). If the received key is valid, the feature control manager 130 generates a command to the ultrasound device application 110 to enable the use of the feature (step 530). If the key is invalid, an error message is sent to the application 110, and the application 110 will continue to operate as if the feature is not available to the user.

Preferably, the feature control manager 130 automatically attempts to validate every feature each time the ultrasound device 100 is powered-up. Alternatively, the validation function can be automatically performed each time an ultrasound application 110 is asked to perform a feature. As another alternative, some features can be automatically validated at power-up and other features can be automatically validated on a per-need basis. In yet another alternative, the feature control manager 130 can automatically perform the comparison once and store the result in the database 160 in a field indicating whether the feature is enabled. For later validations (e.g., the next time the device is powered-up or the next time an application is asked to perform a feature), the feature control manager 130 can merely consult the database 160 to determine whether a given feature is designated as enabled.

Instead of enabling features permanently, features can be temporarily enabled. If a feature is temporarily enabled, an expiration date can be associated with the feature, and the feature can be disabled after the expiration date has passed. This allows a feature to be used on a trial basis. In operation, the feature control manager 130 can compare the current date and/or time with the expiration information, for example, the next time the device is powered-up or the next time an application is asked to perform a feature. An application 110 can alert a user when a feature is about to expire. As an alternative to date enabling a feature, a vendor can send a command to the feature control manager 130 to delete a key stored in the database 160. This can occur, for example, during maintenance of the device 100 by the vendor or by a data transmission from the vendor.

The preferred embodiments described above provide several advantages. First, a user who is unfamiliar with a hardware or software feature can enable this feature on demand for evaluation purposes. In this way, users who might not have realized the benefit of the feature can purchase the key that will enable the feature for a longer duration. If the user does not want to purchase the right to permanently use the feature, a user can pay a reduced fee for temporary use. Additionally, because the necessary hardware is factory-installed in and shipped with the ultrasound device, a user who desires the temporary or permanent use of a hardware feature can enable the feature simply by receiving the enabling key on demand without taking the ultrasound device off-line.

In one preferred embodiment, the key comprises information that is unique to the ultrasound device, such as a serial number. This prevents unauthorized use of the key on other ultrasound devices. The key preferably also comprises a code that is unique to a corresponding feature (e.g., a secret feature name). It is preferred that the secret feature name and the ultrasound device serial number be securely stored in the feature control database 160 using a "use once lock to key password" commonly known in the art to prevent unauthorized access and alteration of information. With a "use once lock to key password," also known as an authenticating token, the ultrasound device generates a random code (lock) and the token at the vendor, for example, must convert it to the right password (key). One suitable algorithm for this arrangement is: key=(((a*lock) mod (2^32))+c) mod m, where a, c, and m are secret integers.

To validate a feature, the feature control manager 130 compares the serial number of the device 100 and the secret feature name stored in the database 160 with the corresponding information present in the key. Of course, the key used to enable a disabled feature can comprise any information in addition to or instead of the secret feature name and the device serial number.

In another preferred embodiment, the key is encrypted to further reduce the likelihood of unauthorized use of a feature. The key can be decrypted once (e.g., upon receipt of the key or upon the first validation of the key), or the key can be decrypted every time the feature control manager 130 validates the key. It is preferred that the ultrasound device serial number, the secret feature name, and the expiration date be used with an encryption algorithm that uses commonly known public key (serial number) and private key (secret feature name) techniques. Other public keys can include an ethernet hardware id, a number generated by a block-dongle located on a port, or any other unique number stored in the ultrasound device.

It is preferred that the cryptography algorithm be a block cipher, which transforms data in fixed size one byte at a time (i.e., the size of the encrypted data and the key will always be of the same length and the same key will always be generated for the same data). Common block ciphers include DES (64 bit data block, 56 bit crypto key), International data encryption algorithm (IDEA) (64 bit/128 bit), and SKIP-JACK (64 bit/80 bit). "Applied Cryptography: Protocol, Algorithms and source code in C" by Schnieder and "The Codebreakers: The Story of Secret Writing" by Kahn contain information on how to construct a crypto algorithm or device. In the preferred embodiment, a stream cipher is used with a seven-bit stream that is known to the ultrasound device. The seven-bit ASCII character data to be encrypted is preferably converted to a bit vector and XOR'ed with the key stream to create an encrypted bit vector for each character. The encrypted bit vector is then preferably transformed back into ASCII character data for entry into the ultrasound device. The ultrasound device decrypts the entry by performing the XOR function with the bitstream against the encrypted bit vector. As an added measure of security, it is preferred that the ultrasound device refuse further key entries if an incorrect key is entered multiple times. Further, it is preferred that the secret feature key be in nonsensical English since one could mathematically derive the cryptography algorithm given that the English language has a known probability of letter patterns and word structure.

The feature controller 120 preferably comprises the software and hardware components necessary to perform the operations described above. For example, the functions of the feature control manager 130 can be performed with software routines executed by a hardware component such as a CPU or can be implemented exclusively with hardware. It is important to note that any appropriate hardware, analog or digital, and any appropriate software language can be used. It also is important to note that although these components are shown as distinct elements in FIG. 1, the software and hardware functionality can be combined with each other as well as with other components in the ultrasound device 100. For example, the feature receiver 140 and the key receiver 150 can both correspond to a single disc drive or a single modem in the ultrasound device 100. As another example, the CPU that runs the software routine of the feature control manager 130 can be the same CPU that runs other routines used by the ultrasound device 100. Further, the routines themselves can be combined with the ultrasound applications 110 or other routines. It is preferred that the feature control database 160 be stored on a storage device such as hard disk, although other storage devices, such as transportable media, can be used. Additionally, while the feature controller 120 is shown as part of the ultrasound device 100 in FIG. 1, it is possible for the controller 120 to be located external to the device 100, for example, in a network coupled with the device 100.

The foregoing detailed description has described only a few of the many forms that this invention can take. Of course, many changes and modifications are possible to the preferred embodiments described above. For this reason it is intended that this detailed description be regarded as an illustration and not as a limitation of the invention. It is only the following claims, including all equivalents, that are intended to define the scope of this invention.

What is claimed is:

1. A method for enabling features on an ultrasound device, the method comprising:
    (a) providing an ultrasound device with a disabled feature, said disabled feature being provided before said ultrasound device is upgraded;
    (b) upgrading said ultrasound device by supplying said ultrasound device with a key operative to enable said disabled feature; and
    (c) with an application-level software routine in said ultrasound device, enabling said disabled feature with said key, wherein said feature is enabled before the next time said ultrasound device is powered-up.

2. The method of claim 1, wherein (a) comprises providing an ultrasound device with a disabled feature before a user receives said ultrasound device.

3. The method of claim 1, wherein (a) comprises providing an ultrasound device with a disabled feature after a user receives said ultrasound device.

4. The method of claim 1, wherein (a) comprises remotely providing an ultrasound device with a disabled feature.

5. The method of claim 1, wherein (a) comprises locally providing an ultrasound device with a disabled feature.

6. The method of claim 1, wherein (b) comprises remotely supply said ultrasound device with a key operative to enable said disabled feature.

7. The method of claim 1, wherein (b) comprises locally supplying said ultrasound device with a key operative to enable said disabled feature.

8. The method of claim 1, wherein (c) comprises temporarily enabling said disabled feature.

9. The method of claim 1, wherein (c) comprises enabling said disabled feature with said key in response to said key being unexpired.

10. The method of claim 1, wherein (c) comprises permanently enabling said disabled feature.

11. The method of claim 1, wherein said key varies as a function of a serial number of said ultrasound device and a code corresponding to said disabled feature.

12. The method of claim 1, wherein said key varies as a function of a serial number of said ultrasound device, a code corresponding to said disabled feature, and an expiration date.

13. A method for enabling features on an ultrasound device, the method comprising:
    (a) providing an ultrasound device with a disabled feature before said ultrasound device is upgraded;
    (b) upgrading said ultrasound device by supplying said ultrasound device with an encrypted key;
    (c) decrypting said encrypted key; and
    (d) with an application-level softare routine in said ultrasound device, enabling said disabled feature with said decrypted key, wherein said feature is enabled before the next time said ultrasound device is powered-up.

14. The method of claim 13, wherein said encrypted key varies as a function of a serial number of said ultrasound device and a code corresponding to said disabled feature.

15. The method of claim 13, wherein said encrypted key varies as a function of a serial number of said ultrasound device, a code corresponding to said disabled feature, and an expiration date.

16. A method for enabling features on an ultrasound device, said ultrasound device comprising a feature control manager and an ultrasound device application, the method comprising:
 (a) providing an ultrasound device with a disabled feature, said disabled feature being provided before said ultrasound device is upgraded;
 (b) upgrading said ultrasound device by supplying said ultrasound device with a key operative to enable said disabled feature;
 (c) with a feature control manager of said ultrasound device, receiving a request for validation of a feature from an ultrasound device application, wherein the feature control manager comprises an application-level software routine;
 (d) with said feature control manager of said ultrasound device, validating said requested feature; and
 (e) with said feature control manager of said ultrasound device, providing said ultrasound device application with a command operative to enable said feature, wherein said feature is enabled before the next time said ultrasound device is powered-up.

17. The method of claim 16, where (c) comprises receiving a feature name from an ultrasound device application.

18. The method of claim 16, wherein (c) is automatically performed during power-up of said ultrasound device.

19. The method of claim 16, wherein (c) is automatically performed when said application is called to use said feature.

20. The method of claim 16, where (d) comprises comparing a key provided to said ultrasound device wit a code stored in said ultrasound device, said key and said code corresponding to said feature.

21. An ultrasound device feature controller comprising:
 a feature control manager comprising an application-level software routine,
 a feature control database coupled wit said feature control manager and comprising a disabled feature provided to said ultrasound device before said ultrasound device is upgraded; and
 a key receiver coupled with said feature control manager, said key receiver operative to receive a key during an upgrade to said ultrasound device;
 wherein said feature control manager is operative to receive a request for validation of a feature from an ultrasound device application and validate said request by providing said ultrasound device application with a command operative to enable said feature, further wherein said feature is enabled before the next time said ultrasound device is powered-up.

22. The invention of claim 21, further comprising a feature receiver coupled with said feature control manager.

23. The invention of claim 21, wherein said key receiver comprises a disk drive.

24. The invention of claim 21, wherein said key receiver comprises a network link.

25. The invention of claim 21, wherein said key receiver comprises a modem.

26. The invention of claim 21, wherein said key receiver comprises a user interface.

27. The invention of claim 21, wherein said feature control manager is operative to compare a key supplied to said key receiver with a code stored in said feature control database.

28. An ultrasound device feature controller of an ultrasound device comprising:
 means for receiving a key operative to enable a disabled feature of an ultrasound device; and
 means for enabling said disabled feature of said ultrasound device with said key, said means for enabling comprising an application-level software routine;
 wherein said disabled feature is provided in said ultrasound device before said ultrasound device is upgraded, wherein said key is received when said ultrasound device is upgraded, and wherein said feature is enabled before the next time said ultrasound device is powered-up.

29. The invention of claim 28, wherein said key is encrypted, and wherein the invention further comprises means for decrypting said key.

30. The invention of 1, 13, 16, 21, or 28, wherein said ultrasound device comprises an ultrasound imaging system.

31. The invention of 1, 13, 16, 21, or 28, wherein said ultrasound device comprises an ultrasound image review station.

* * * * *